(12) United States Patent
Chitlur (10) Patent No.: US 10,019,390 B2
(45) Date of Patent: Jul. 10, 2018

(54) USING MEMORY CACHE FOR A RACE FREE INTERRUPT SCHEME WITHOUT THE USE OF "READ CLEAR" REGISTERS

(75) Inventor: Nagabhushan Chitlur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1349 days.

(21) Appl. No.: 13/436,548

(22) Filed: Mar. 30, 2012

(65) Prior Publication Data

US 2013/0262727 A1   Oct. 3, 2013

(51) Int. Cl.
*G06F 13/24*   (2006.01)

(52) U.S. Cl.
CPC .................... *G06F 13/24* (2013.01)

(58) Field of Classification Search
USPC .................................. 710/260–269
See application file for complete search history.

(56) References Cited

U.S. PATENT DOCUMENTS

| | | | |
|---|---|---|---|
| 5,919,255 A * | 7/1999 | Seshan et al. ................. | 710/262 |
| 6,205,509 B1 * | 3/2001 | Platko et al. .................. | 710/269 |
| 6,374,320 B1 * | 4/2002 | Klein ..................... | G06F 13/126 |
| | | | 710/260 |
| 6,378,023 B1 * | 4/2002 | Christie ................... | G06F 13/24 |
| | | | 710/260 |
| 7,584,316 B2 * | 9/2009 | Oner .................... | G06F 13/4027 |
| | | | 710/260 |
| 8,312,198 B2 * | 11/2012 | Tiruvallur et al. ........... | 710/268 |
| 8,463,971 B2 * | 6/2013 | Solomita et al. ............. | 710/267 |
| 8,635,387 B2 * | 1/2014 | Liu .......................... | G06F 13/24 |
| | | | 710/260 |
| 2001/0008003 A1 * | 7/2001 | Klein ..................... | G06F 13/126 |
| | | | 710/260 |
| 2002/0029310 A1 * | 3/2002 | Klein ............................ | 710/260 |
| 2002/0194409 A1 * | 12/2002 | Marr et al. ..................... | 710/260 |
| 2005/0060462 A1 * | 3/2005 | Ota ................................ | 710/260 |
| 2005/0273540 A1 * | 12/2005 | Whaley ................... | G06F 13/24 |
| | | | 710/260 |
| 2009/0307433 A1 * | 12/2009 | Jones et al. ................... | 711/137 |
| 2010/0036987 A1 * | 2/2010 | Streett et al. ................. | 710/269 |

\* cited by examiner

*Primary Examiner* — Raymond Phan
(74) *Attorney, Agent, or Firm* — Alliance IP, LLC (57) ABSTRACT

A computer device includes a processor, a circuit block capable of issuing an interrupt to the processor, and a cacheable memory configured to include a register that is mapped to the logic block for storing interrupt status information of the logic block.

21 Claims, 6 Drawing Sheets

USING MEMORY CACHE FOR A RACE FREE INTERRUPT SCHEME WITHOUT THE USE OF "READ CLEAR" REGISTERS

FIELD OF THE INVENTION

The present disclosure pertains to coordinating operations of circuit blocks with a processor in a device, in particular, to a scheme for handling interrupts generated from these logic blocks to the processor.

BACKGROUND

Devices such as computers and mobile phones may include a processor and a plurality of reusable circuit units, commonly referred to as logic blocks. These logic blocks may be produced by different third-party entities to perform certain functionalities for the devices. For example, computers may include a processor such as a central processing unit (CPU) and logic blocks such as graphics processing units (GPUs), hard disks (HDs), and I/O peripherals. The processor may be programmed with software instructions to execute certain functions including interactions with the logic blocks. Often times, a logic block may need immediate attention from the processor to deal with special situations. For example, a logic block may have a hardware error that may need to be resolved by the processor immediately, or the logic block may have special situations (such as receiving data) that may need to notice the processor immediately. In such events, the logic block may generate one or more interrupts to the processor to inform about the immediate needs by the logic block.

Figure 1:
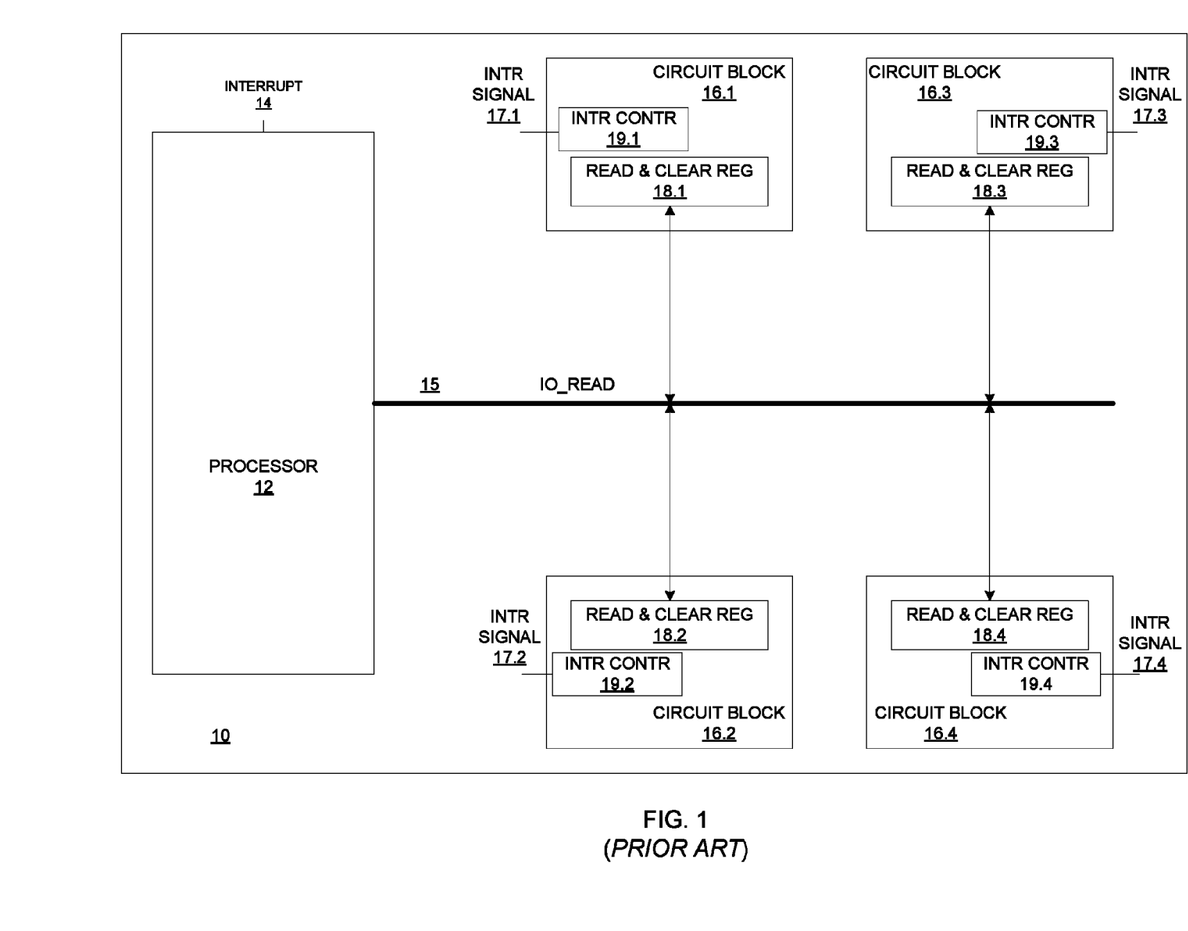
FIG. 1 illustrates a device that includes a processor and logic blocks working collaboratively through an interrupt scheme.

FIG. 1 illustrates a device that includes a processors and logic blocks working collaboratively through an interrupt scheme. Referring to FIG. 1, a device 10 may include a processor 12 and a plurality of logic blocks 16.1-16.4. The processor 12 may be programmed to execute scheduled operations according to an instruction stream. Each of logic blocks 16.1-16.4 may, at the instruction of the processor 12 or controllers embedded in these logic blocks, perform their respective function. The processor 12 may communicate with logic blocks 16.1-16.4 through a bus system 15 so that processor 12 may send execution instructions to and read status information from logic blocks 16.1-16.4. Processor 12 may include an interrupt pin 14 that, if triggered, may cause processor 12 to temporally suspend the execution of the on-going instruction stream and initiate special codes to service the interrupt. Thus, upon receiving an interrupt, processor 12 may first finish the currently executing instruction, save all the data that is necessary for resuming the currently executing instruction stream, and suspend the current instruction stream. Further, the processor may, based on the type of interrupt, start to execute a special program (such as a driver software) that services the interrupt from these logic blocks.

Each of logic blocks 16.1-16.4 may include a respective interrupt controller 19.1-19.4 that may generate an interrupt if an interrupt event occurs. Further, each of logic blocks 16.1-16.4 may include a respective pin 17.1-17.4 for outputting the generated interrupt signal. Pins 17.1-17.4 may be respectively connected to pin 14 of the processor so that processor 12 may receive the generated interrupts from logic blocks 16.1-16.4. Further, logic blocks 16.1-16.4 may each include a read and clear register (RC) 18.1-18.4 that may store status information of interrupts so that processor 12 may read the status information from RC 18.1-18.4 through bus system 15. Thus, in response to the occurrence of interrupting events, logic blocks 16.1-16.4 may save interrupt status information in their respective RC 18-18.4. Thus, in response to the receipt of an interrupt from a logic block at pin 14, processor 12 may suspend the on-going instruction stream and start a special program to service the interrupt. The special program may include read interrupt status information from the corresponding RC and after servicing the interrupt, clear the corresponding RC through the bus system 15.

With the ever increasing sophistication of electronic devices, a device may include numerous logic blocks that generate a large amount of interrupts that require immediate attention from processor 12. Thus, any delays during handling interrupts may degrade the performance of the device. For example, since RC 18.1-18.4 reside on logic blocks, processor 12 needs to use the slower I/O read and write instructions to access RC 18.1-18.4. Since RC 18.1-18.4 reside on logic blocks, they may not be mapped as cacheable memory to the processor. Thus, the read/clear operations of RC 18.1-18.4 may be slow and degrade device performance. Thus, it may not be desirable for processor 12 to retrieve interrupt status information from RC 18.1-18.4.

DETAILED DESCRIPTION

There is a need to reduce the time required for accessing interrupt status information by a processor. Embodiments of the present invention may include a device that uses cacheable memory, rather than "read clear" (RC) registers, to store interrupt status information. The cacheable memory is a portion of the main memory whose content may be moved to the cache memory of the processor so that they can be read and written by the processor quickly. Since the access to the cacheable memory is 5-10 times faster than the access to RC in logic blocks, the performance of the device may be correspondingly improved. Further, embodiments of the present invention may map a pair of registers on the cacheable memory for each logic block. The pair of registers may include a first register for storing information relating to pending interrupts and a second register for storing information relating to interrupts that have been serviced by software codes. In this way, the interrupts from logic blocks may be handled race free and efficiently.

Embodiments of the present invention may be directed to a device that may include a processor, a logic block capable of issuing an interrupt to the processor, and a cacheable memory configured to include a first register that is mapped to the logic block for storing interrupt status information of the logic block. The cacheable memory may further include a second register for storing status information of interrupts that have been serviced by the processor.

Embodiments of the present invention may be directed to a processor that is communicatively connected to a cacheable memory for storing interrupt information that is generated by logic block for a processor. The cacheable memory may include a first register being mapped to the logic block for storing interrupt status information of the logic block and a second register for storing status information of interrupts that have been serviced by the processor.

Embodiments of the present invention may include a method for handling interrupts from a logic block (or an intellectual property block, or IP block) to a processor, the method including steps of receiving an interrupt from the logic block; reading, from a first register of a cacheable memory, interrupt status information of the logic block; servicing interrupts based on the interrupt status information of the logic block; and in response to completing the servicing, writing, in a second register of the cacheable memory, status information of interrupts that have been serviced by the processor.

Figure 2:
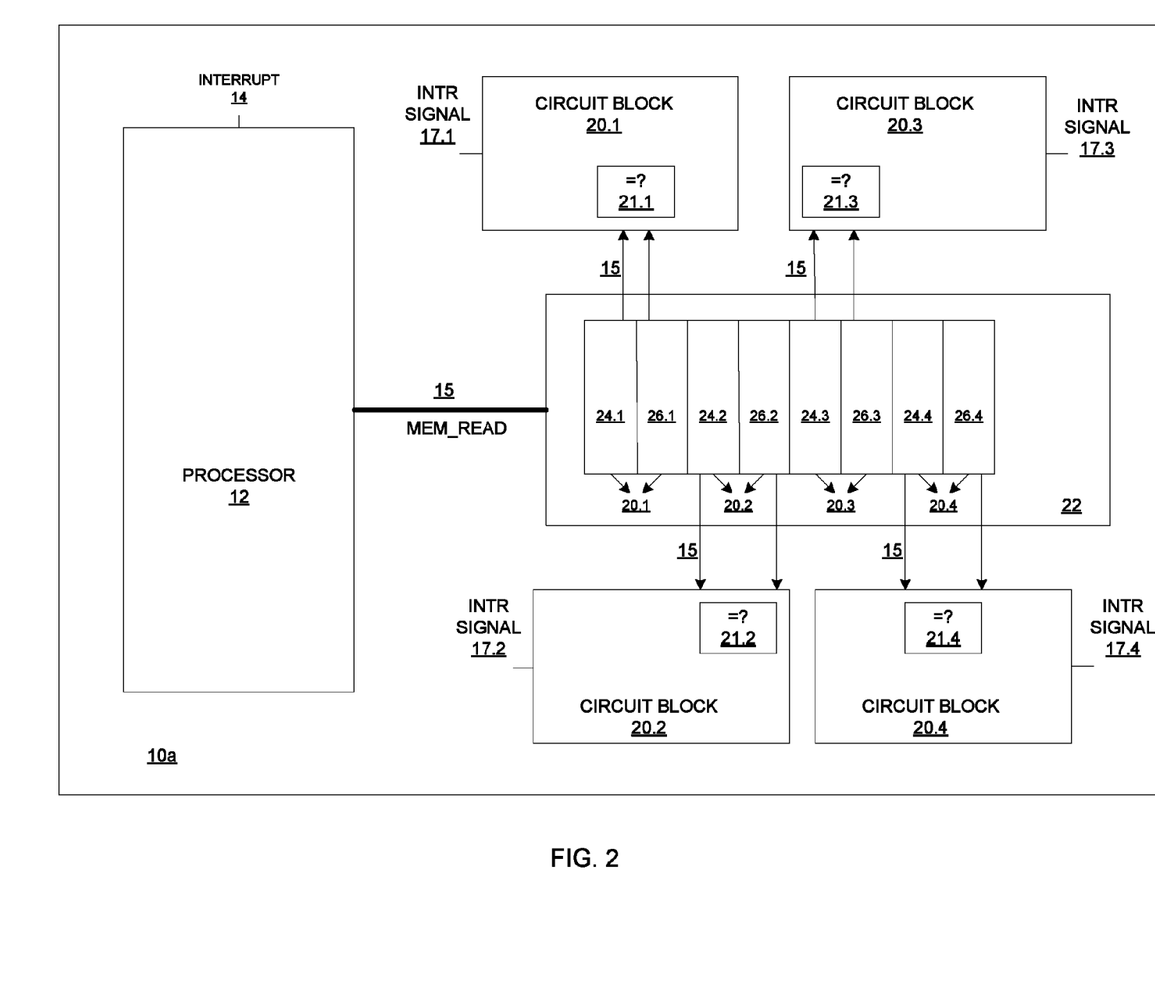
FIG. 2 illustrates a device that includes a processor and logic blocks working collaboratively through an interrupt scheme according to an embodiment of the present invention.

FIG. 2 illustrates a device that includes a processor and logic blocks working collaboratively through an interrupt scheme according to an embodiment of the present invention. Referring to FIG. 2, a device 10a, like device 10 as shown in FIG. 1, may include a processor 12. Device 10a may further include a plurality of logic blocks 20.1-20.4 and a cacheable memory 22 that is separate from, but communicatively connected to processor 12 and logic blocks 20.1-20.4 through a bus system 15. Each of the logic blocks 20.1-20.4 may include an interrupt controller (not shown) for generating interrupts in response to the occurrence of interruption events. The generated interrupts may be output through output pins 17.1-17.4 of logic blocks 20.1-20.4 to interrupt pin 14 of processor 12 to trigger processor 12 to service the interruption event. However, logic blocks 20.1-20.4 may omit the read and clear register (interrupt status register). Instead, cacheable memory 22 may include a plurality of register pairs 24.1-24.4, 26.1-26.4. Each register pair is mapped to a respective logic block. Thus, register pair 24.1, 26.1 is mapped to logic block 20.1 for storing interrupt status information for logic block 20.1; register pair 24.2, 26.2 is mapped to logic block 20.2 for storing interrupt status information for logic block 20.2; register pair 24.3, 26.3 is mapped to logic block 20.3 for storing interrupt status information for logic block 20.3; register pair 24.4, 26.4 is mapped to logic block 20.4 for storing interrupt status information for logic block 20.4.

Cacheable memory 22 may be a centralized memory that is accessible by processor 12 and logic blocks, as well as by other resources in device 10a. Further, processor 12 may read and write the content of cacheable memory 22 using memory read/write (mem_read, mem_write) commands which are much faster than I/O read/write commands that are used for accessing RC registers. Thus, processor 12 may read and write the interrupt status information stored in register pairs 24.1-24.4, 26.1-26.4 much faster and handling interrupt events much faster.

Figure 3:
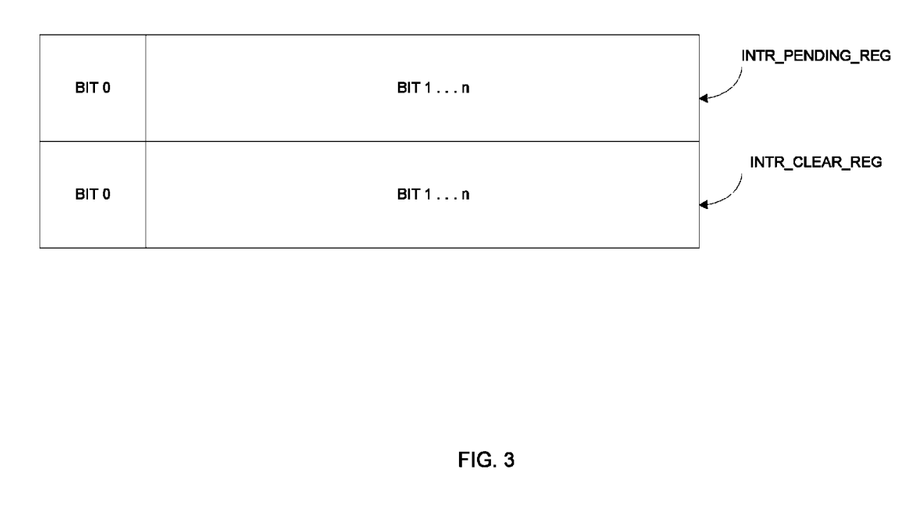
FIG. 3 illustrates a register pair of interrupt pending register (INTR_PENDING_REG) and interrupt clear register (INTR_CLEAR_REG) according to an embodiment of the present invention.

Each of register pairs 24.1-24.4, 26.1-26.4 may include a first register (INTR_PENDING_REG) for tracking the interrupts issued by the corresponding logic block and a second register (INTR_CLEAR_REG) for tracking interrupts that have been serviced by processor 12. FIG. 3 illustrates a register pair according to an embodiment of the present invention. The INTR_PENDING_REG may include n bits in which the first bit, or INTR_PENDING_REG[0], may be set by the interrupt controller of the corresponding logic block to indicate that there are pending interrupts from the corresponding logic block that need to be serviced by the processor. The rest bits or INTR_PENDING_REG[n:1], may be used to store a count of interruption events that have occurred on the corresponding logic block. This count may be updated by the interrupt controller of the corresponding logic block. For example, each time a new interrupt occurs, the interrupt controller of the corresponding logic block may increase the count by one. In an embodiment, the processor 12 can read from INTR_PENDING_REG, but cannot write to INTR_PENDING_REG. In this sense, INTR_PENDING_REG is a read-only register by the processor 12.

INTR_CLEAR_REG may similarly include n bits in which the first bit, or INTR_CLEAR_REG [0], may be set by the processor executing a driver software to indicate validity of the already serviced interrupt count. INTR_CLEAR_REG[0] may be set by the driver software in response to the driver software starts to service a first interrupt. Further, INTR_CLEAR_REG[0] may be reset by the interrupt controller of the corresponding logic block after all pending interrupts are serviced. The rest of bits of INTR_CLEAR_REG, or INTR_CLEAR_REG[n:1], may be used to store a count of last interrupts that have been serviced by the driver software. Thus, each time the driver software finish servicing a number of interrupt, the driver software may cause this count to increase by the number.

By comparing the count of pending interrupts stored in INTR_PENDING_REG[n:1] with the count of serviced interrupts stored in INTR_CLEAR_REG[n:1], the logic block may determine whether all pending interrupts have been serviced or not. Referring to FIG. 2, in an embodiment, each logic block may include a respective comparator 21.1-21.4 which may compare the count of pending interrupts stored in INTR_PENDING_REG with the count of serviced interrupts stored in INTR_CLEAR_REG in response to the processor completing the service of an interrupt. The comparator 24 may continuously (namely, at every clock cycle) compare the two counts, and when they are equal, it clears the two registers. In response to a determination that the two counts are the same indicating that all pending interrupts have been serviced by the processor, the interrupt controller of the logic block may reset all bits of both INTR_PENDING_REG and INTR_CLEAR_REG so that they are ready for a next round of interrupt events.

Figure 4:
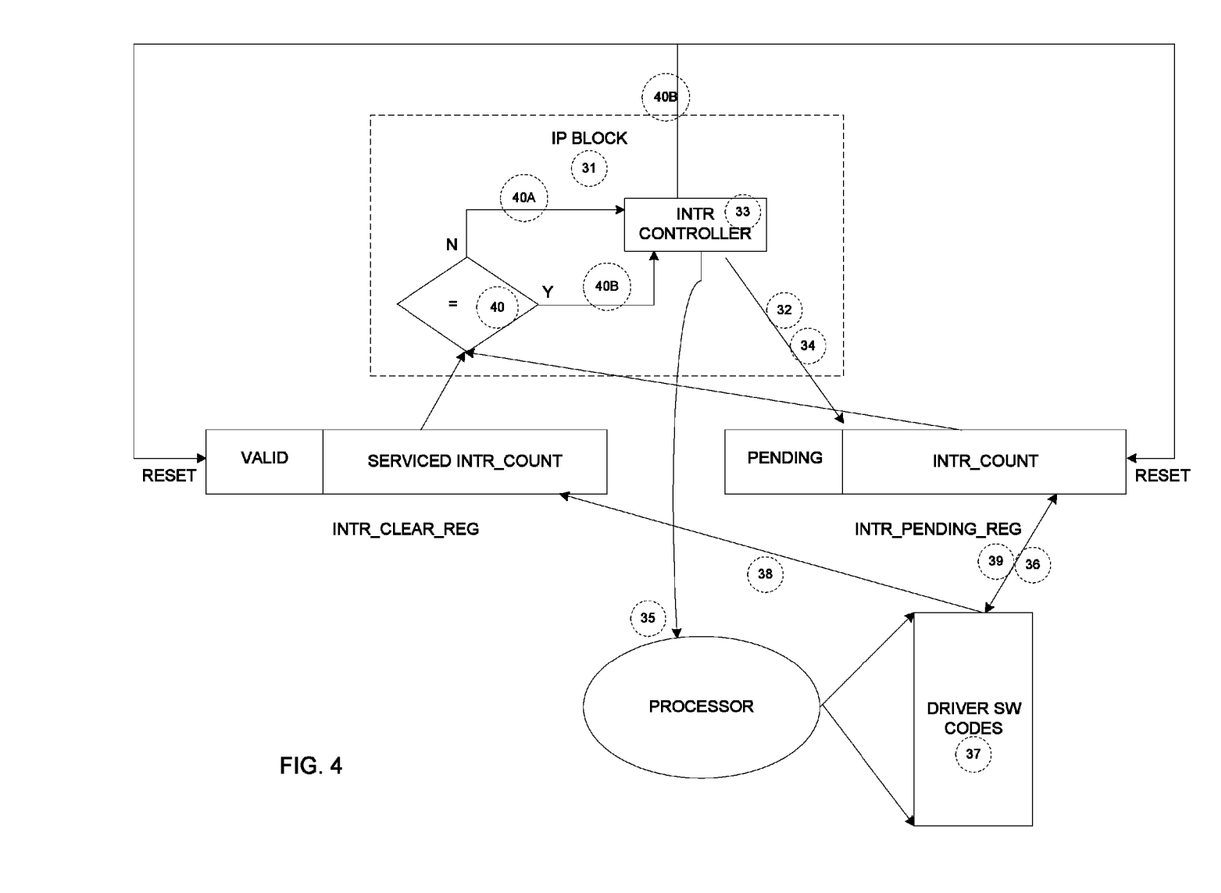
FIG. 4 is a flow diagram illustrating a process of handling interrupts according to an embodiment of the present invention.

FIG. 4 is a flow diagram illustrating a process of handling interrupts according to an embodiment of the present invention. The numerals within dashed circles indicate the order of steps. Referring to FIG. 4, at step 31, an interruption event may occur in the logic block. The occurrence of the interruption event may require issuance of an interrupt. In response to the occurrence of the interruption event, at step 32, an interrupt controller that resides in the logic block may set INTR_PENDING_REG[0]=1 and set INTR_PENDING_REG[n:1]=interrupt count. If only one interruption event occurs, the interrupt count=1. If more than one interrupts occur, the interrupt count equals to the number of interrupts. Then, at step 33, interrupt controller may issue an interrupt to the processor. In the meantime, at step 34, if more interruption events occur in the logic block, the interrupt controller may continue updating the interrupt count stored in INTR_PENDING_REG[n:1] to reflect the pending interrupts, but may not issue further interrupts to the processor until INTR_PENDING_REG[0] is cleared (or reset to 0).

At step 35, a driver software of the processor may receive the first interrupt issued by the interrupt controller. In response to the receipt of the first interrupt, the driver software of the processor may cause to suspend currently on-going instruction stream and start the codes for servicing the interrupt. At step 36, the driver software may first read the interrupt count stored in INTR_PENDING_REG[n:1], and then, at step 37, the driver software may start servicing these interrupts. Upon finishing the service of these interrupts, at step 38, the driver software may optionally read the interrupt count stored in INTR_PENDING_REG[n:1] again to determine if the interrupt count has changed (or increased) since the last time it has been read. If the count has changed (which means new interrupts have arrived), the driver software has the option to service these new interrupts as well. Once the driver software has serviced interrupts, at step 39, the processor may be programmed to set INTR_CLEAR_REG[0]=1 and INTR_CLEAR_REG[n:1]=interrupt count that was last serviced by the driver software.

In response to an update at INTR_CLEAR_REG[n:1], at step 40, a comparator in the logic block may compare the pending interrupt counts stored in INTR_PENDING_REG[n:1] with the already serviced interrupt count stored in INTR_CLEAR_REG[n:1] to determine if they are equal. If they are different, it means that there are more pending interrupts than already serviced interrupts. Therefore, at step 40A, a new interrupt may be issued by the interrupt controller to the processor to request servicing more interrupts. Alternatively, if they are the same, it means that all pending interrupts have been serviced. In response, at step 40B, the interrupt controller may not issue a new interrupt. Instead, it may issue reset signals to both INTR_CLEAR_REG and INTR_CLEAR_REG to clear the register pair so that they are ready for a next round of interrupt events.

Figure 5:
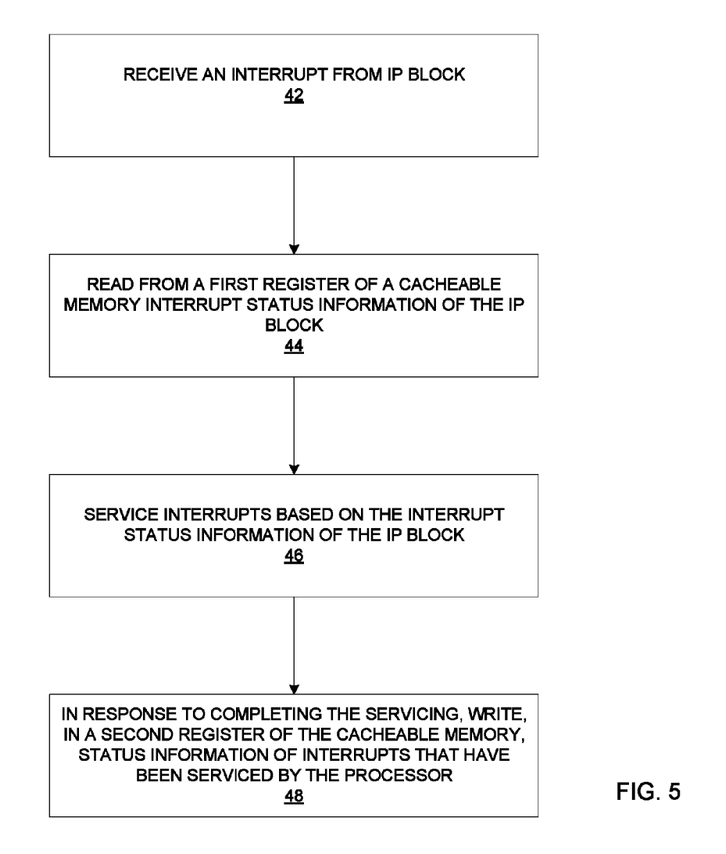
FIG. 5 is a flow diagram illustrating a process by the processor to handling interrupts according to an embodiment of the present invention.

FIG. 5 is a flow diagram illustrating a process by the processor to handling interrupts according to an embodiment of the present invention. At step 42, the processor may receive an interrupt at its interrupt pin from the logic block. At step 44, the processor may read from INTR_PENDING_REG of the cacheable memory interrupt status information including INTR_PENDING_REG[0] for indication of whether there is any pending interrupt and INTR_PENDING_REG[n:1] for a count of pending interrupts. At step 46, the processor may execute a driver software to service interrupts based on the interrupt status information. At step 48, in response to completion of servicing interrupts, the processor may write in INTR_CLEAR_REG of the cacheable memory status information of interrupts that have been serviced by the driver software. The processor may set INTR_CLEAR_REG[0]=1 to indicate that there are already serviced interrupts and increase INTR_CLEAR_REG[n:1] by the amount of a number of last serviced interrupts.

Figure 6:
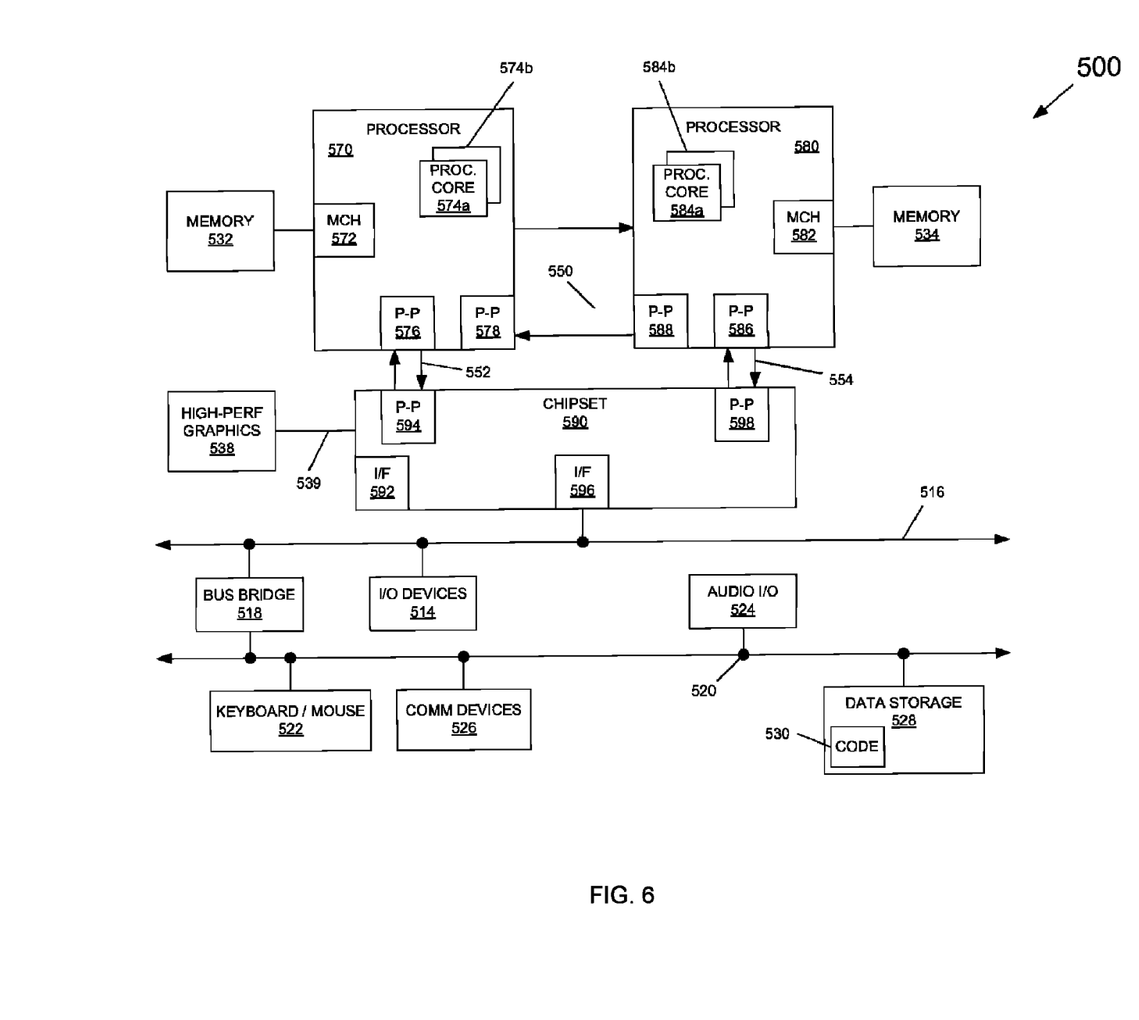
FIG. 6 is a block diagram of a system according to an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b), and potentially many more cores may be present in the processors. The processors each may perform variation-aware scheduling based on profile information obtained and stored in on-chip storage in accordance with an embodiment of the present invention to improve energy efficiency.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory (e.g., a dynamic random access memory (DRAM)) locally attached to the respective processors, and which collectively may maintain a directory. First processor 570 and second processor 580 may be coupled to chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Note that while shown in the embodiment of FIG. 6 as a multi-package system (with each package including a multicore processor) coupled via point-to-point interconnects, the scope of the present invention is not so limited. In other embodiments, other interconnects such as a front side bus may couple together processors in a dual or multiprocessor system. Still further, understand that embodiments may further be used in uniprocessor systems, e.g., in a system having a processor with a single core or multiple cores.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A computing device, comprising:
   a processor;
   a logic block configured to issue an interrupt to the processor; and
   a memory cache configured to include a first register and a second register, wherein the first register is to be mapped to the logic block for storing interrupt status information of the logic block and the second register is to store status information of interrupts serviced by the processor.

2. The computing device of claim 1, wherein the first register includes a bit for indicating whether there is at least one interrupt to be serviced by the processor, and wherein the bit is set by the logic block in response to occurrence of at least one interruption event.

3. The computing device of claim 1, wherein the second register includes a bit for indicating whether the processor has serviced at least one interrupt, and wherein the bit is set by a driver of the processor in response to servicing the at least one interrupt.

4. The computing device of claim 1, wherein the second register includes a plurality of bits for indicating a count of interrupts that have been serviced by the processor, and wherein the count is increased by the driver of the processor in response to completing servicing the interrupts.

5. The computing device of claim 1, wherein the memory is part of a main memory of the device, and wherein a content of the memory is mapped to a cache of the processor.

6. The computing device of claim 1, wherein the logic block includes an interrupt controller for issuing the interrupt to the processor.

7. The computing device of claim 2, wherein the first register includes a plurality of bits for indicating a count of interrupts to be serviced by the processor, and wherein the count is increased by the logic block in response to interruption events.

8. The computing device of claim 4, further comprising a comparator that compares the count of interrupts to be serviced by the processor and the count of interrupts that have been serviced by the processor to determine whether the two counts are equal.

9. The computing device of claim 8, wherein if the two counts are equal, the logic block resets the first and second registers, and if the two counts are not equal, the logic block issues a new interrupt to the processor for requesting servicing additional interrupts.

10. The computing device of claim 9, wherein the first register is read only by the processor.

11. A processor communicatively connected to a memory cache for storing interrupt information that is generated by a logic block for the processor, the memory cache comprising:
a first register mapped to the logic block for storing interrupt status information of the logic block; and
a second register to store status information of interrupts that have been serviced by the processor.

12. The processor of claim 11, wherein the first register includes a bit for indicating whether there is at least one interrupt to be serviced by the processor, and wherein the bit is set by the logic block in response to occurrence of at least one interruption event.

13. The processor of claim 12, wherein the first register includes a plurality of bits for indicating a count of interrupts to be serviced by the processor, and wherein the count is increased by the logic block in response to interruption events.

14. The processor of claim 13, wherein the second register includes a bit for indicating whether the processor has serviced at least one interrupt, and wherein the bit is set by a driver of the processor in response to servicing the at least one interrupt.

15. The processor of claim 14, wherein the second register includes a plurality of bits for indicating a count of interrupts that have been serviced by the processor, and wherein the count is increased by the driver of the processor in response to completing servicing the interrupts.

16. A method for handling interrupts from a circuit block to a processor, comprising:
receiving, by the processor, an interrupt from the logic block;
reading, by the processor from a first register of a memory cache, interrupt status information of the logic block;
servicing, by the processor, interrupts based on the interrupt status information of the logic block; and
in response to completing the servicing, writing, by the processor in a second register of the memory cache, status information of interrupts that have been serviced by the processor.

17. The method of claim 16, wherein the interrupt status information stored on in the first register includes:
a bit for indicating whether there is at least one interrupt to be serviced by the processor, wherein the bit is set by the logic block in response to occurrence of at least one interruption event; and
a plurality of bits for indicating a count of interrupts to be serviced by the processor, wherein the count is increased by the logic block in response to interruption events.

18. The method of claim 17, wherein the status information of interrupts that have been serviced by the processor includes:
a bit for indicating whether the processor has serviced at least one interrupt, wherein the bit is set by a driver of the processor in response to servicing the at least one interrupt; and
a plurality of bits for indicating a count of interrupts that have been serviced by the processor, wherein the count is increased by the driver of the processor in response to completing servicing the interrupts.

19. The method of claim 16, wherein the first register is read only by the processor.

20. A machine-readable non-transitory medium having stored thereon machine-executable codes that, when executed, performs a method for handling interrupts from a circuit block to a processor, the method comprising:
receiving an interrupt from the logic block;
reading, from a first register of a memory cache, interrupt status information of the logic block;
servicing interrupts based on the interrupt status information of the logic block; and
in response to completing the servicing, writing, in a second register of the memory cache, status information of interrupts that have been serviced by the processor.

21. The machine-readable non-transitory medium of claim 20, wherein the interrupt status information stored in the first register includes:
a bit for indicating whether there is at least one interrupt to be serviced by the processor, wherein the bit is set by the logic block in response to occurrence of at least one interruption event; and
a plurality of bits for indicating a count of interrupts to be serviced by the processor, wherein the count is increased by the logic block in response to interruption events.

* * * * *